US009628388B2

(12) United States Patent
Errickson et al.

(10) Patent No.: US 9,628,388 B2
(45) Date of Patent: Apr. 18, 2017

(54) REMOTELY CONTROLLED MESSAGE QUEUE

(71) Applicant: International Business Machines Corporation, Armonk, NY (US)

(72) Inventors: Richard K. Errickson, Poughkeepsie, NY (US); Thomas A. Gregg, Highland, NY (US); Leonard W. Helmer, Jr., Stone Ridge, NY (US); Michael P. Lyons, Poughkeepsie, NY (US); Kulwant M. Pandey, Lagrangeville, NY (US); Peter K. Szwed, Rhinebeck, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/063,675

(22) Filed: Mar. 8, 2016

(65) Prior Publication Data

US 2016/0173380 A1  Jun. 16, 2016

Related U.S. Application Data

(63) Continuation of application No. 14/211,187, filed on Mar. 14, 2014.

(51) Int. Cl.
*H04L 12/801* (2013.01)
*H04L 29/06* (2006.01)
*H04L 12/863* (2013.01)

(52) U.S. Cl.
CPC .............. *H04L 47/12* (2013.01); *H04L 47/62* (2013.01); *H04L 47/628* (2013.01); *H04L 69/14* (2013.01); *H04L 69/22* (2013.01)

(58) Field of Classification Search
CPC ...................................................... H04L 47/12
(Continued)

(56) References Cited

U.S. PATENT DOCUMENTS

| 5,488,734 A | 1/1996 | Bailey et al. |
| 5,541,964 A | 7/1996 | Cohen et al. |

(Continued)

OTHER PUBLICATIONS

IBM, "CICS/VSE Client/Server Solutions Implementing the Message Queue Interface", Document No. GG24-4263-00, Jul. 1994, International Technical Support Organization, Boeblingen Center, 194 pages.

(Continued)

*Primary Examiner* — Parth Patel
(74) *Attorney, Agent, or Firm* — Cantor Colburn LLP; Steven Chiu

(57) ABSTRACT

Embodiments are directed to a computer system for managing data transfer. The computer system includes a memory, a processor communicatively coupled to the memory, a send component and a receive component having a message queue and a controller. A link interface communicatively couples the send component to the receive component. The link interface includes a mainline channel and a sideband channel, and the computer system is configured to perform a method. The method includes transmitting mainline channel messages over the mainline channel from the send component to the receive component. The method further includes transmitting sideband channel messages over the sideband channel from the send component to the message queue of the receive component. The method further includes utilizing the controller to control a flow of the sideband channel messages to the message queue without relying on sending feedback to the send component about the flow.

1 Claim, 9 Drawing Sheets

(58) Field of Classification Search
USPC .......................................................... 370/235
See application file for complete search history.

(56) References Cited

U.S. PATENT DOCUMENTS

| | | | |
|---|---|---|---|
| 5,615,210 A * | 3/1997 | Kaiyama | H04W 92/04 370/389 |
| 5,828,901 A * | 10/1998 | O'Toole | G06F 13/28 709/236 |
| 6,009,472 A | 12/1999 | Boudou et al. | |
| 6,065,089 A | 5/2000 | Hickerson et al. | |
| 6,327,260 B1 | 12/2001 | McGrew | |
| 6,574,694 B1 | 6/2003 | Chen et al. | |
| 7,054,972 B2 | 5/2006 | Parry et al. | |
| 7,140,026 B2 | 11/2006 | Staiger | |
| 7,203,170 B2 | 4/2007 | Dooley | |
| 7,478,186 B1 | 1/2009 | Onufryk et al. | |
| 7,788,434 B2 | 8/2010 | Pesavento et al. | |
| 7,788,435 B2 | 8/2010 | Worthington et al. | |
| 7,924,767 B2 * | 4/2011 | Hoyt | H04L 69/22 370/328 |
| 8,055,818 B2 | 11/2011 | Craddock et al. | |
| 8,356,301 B2 | 1/2013 | Wu et al. | |
| 8,369,364 B2 | 2/2013 | Nakata | |
| 8,478,922 B2 | 7/2013 | Belmar et al. | |
| 9,059,902 B2 | 6/2015 | Singal et al. | |
| 2001/0026551 A1 | 10/2001 | Horlin | |
| 2003/0048750 A1 | 3/2003 | Kobayashi | |
| 2003/0048751 A1 | 3/2003 | Han et al. | |
| 2003/0200368 A1 | 10/2003 | Musumeci | |
| 2003/0200369 A1 | 10/2003 | Musumeci | |
| 2004/0114589 A1 | 6/2004 | Alfieri et al. | |
| 2004/0156317 A1 | 8/2004 | Lund | |
| 2004/0167998 A1 | 8/2004 | Core | |
| 2005/0041631 A1 | 2/2005 | Aerrabotu et al. | |
| 2005/0276261 A1 * | 12/2005 | Kim | H04L 5/1438 370/389 |
| 2006/0083251 A1 | 4/2006 | Kataoka et al. | |
| 2007/0143513 A1 | 6/2007 | Wang et al. | |
| 2007/0162701 A1 | 7/2007 | Schlansker et al. | |
| 2008/0040721 A1 | 2/2008 | Wang et al. | |
| 2008/0075003 A1 | 3/2008 | Lee et al. | |
| 2008/0077724 A1 | 3/2008 | Sarangam et al. | |
| 2008/0147905 A1 | 6/2008 | Shi et al. | |
| 2008/0235424 A1 | 9/2008 | Lee et al. | |
| 2009/0022171 A1 | 1/2009 | Chen et al. | |
| 2009/0287674 A1 * | 11/2009 | Bouillet | G06F 17/30884 |
| 2010/0274940 A1 | 10/2010 | Ahmad et al. | |
| 2011/0044174 A1 * | 2/2011 | Szymanski | H04L 47/56 370/238 |
| 2011/0093637 A1 | 4/2011 | Gupta et al. | |
| 2011/0179413 A1 | 7/2011 | Subramanian et al. | |
| 2011/0286335 A1 | 11/2011 | Dubey | |
| 2012/0039173 A1 | 2/2012 | Danzig et al. | |
| 2012/0096206 A1 | 4/2012 | Talamacki et al. | |
| 2012/0246339 A1 | 9/2012 | Huang et al. | |
| 2013/0046816 A1 * | 2/2013 | Thomas | G06F 9/546 709/203 |
| 2013/0081064 A1 | 3/2013 | Huang et al. | |
| 2013/0201826 A1 | 8/2013 | Testa et al. | |
| 2013/0201831 A1 | 8/2013 | Tal et al. | |
| 2013/0297832 A1 | 11/2013 | Ahmad et al. | |
| 2014/0056142 A1 * | 2/2014 | Racz | H04W 28/08 370/235 |
| 2014/0204743 A1 | 7/2014 | Garcia et al. | |
| 2014/0269324 A1 | 9/2014 | Tietz et al. | |
| 2014/0359185 A1 | 12/2014 | Sawal et al. | |
| 2015/0043330 A1 | 2/2015 | Hu et al. | |
| 2015/0134867 A1 | 5/2015 | Hildner | |
| 2015/0212564 A1 | 7/2015 | Min et al. | |
| 2015/0215840 A1 | 7/2015 | Yiu et al. | |
| 2015/0263956 A1 * | 9/2015 | Errickson | H04L 47/12 370/235 |
| 2015/0341260 A1 * | 11/2015 | Khoo | H04L 45/60 370/401 |

OTHER PUBLICATIONS

Menasce, Daniel A. "MOM vs. RPC: Communication Models for Distributed Applications", IEEE Computer Society, Mar.-Apr. 2005, located at www.computer.org/internet/, pp. 90-93.

Patel, Naresh et al., "A Model of Completion Queue Mechanisms using the Virtual Interface API", IEEE International Conference on Cluster Computing, 2000 Proceedings, pp. 280-288.

* cited by examiner

REMOTELY CONTROLLED MESSAGE QUEUE

DOMESTIC PRIORITY

The present application claims priority to U.S. Non-provisional application 14/211,187 filed on Mar. 14, 2014 titled "REMOTELY CONTROLLED MESSAGE QUEUE," assigned to the assignee hereof and expressly incorporated by reference herein.

BACKGROUND

The present disclosure relates generally to computer system resources, and more specifically to managing the overhead of high-speed data transfers over a link interface.

Data traffic flows throughout computer systems in a variety of configurations and between a variety of components/subsystems. A contemporary data flow configuration includes a send component/subsystem that communicates data through a link to a receive component/subsystem. For example, a computer system architecture includes a communication protocol that connects sound cards, video cards, network cards and other subsystems to a motherboard. Peripheral Component Interconnect Express (PCIe®) is an example of a suitable communication protocol that provides high speed communication through a network of point-to-point serial connections.

As computer systems and their components and subsystems continue to become faster and more powerful, additional messaging methodologies and configurations have been developed to manage higher rates of data transfer. For example, direct memory access (DMA) is a messaging methodology that allows certain hardware subsystems within the computer system to access system memory independently of the system central processing unit (CPU). Computer systems that have DMA channels can transfer data to and from system components with much less CPU overhead than computer systems without DMA channels. DMA can also be used for "memory to memory" copying or moving data within memory. Thus, DMA can offload expensive memory operations, such as large copies or scatter-gather operations, from the CPU to a dedicated DMA engine.

Although high-speed messaging methodologies, such as DMA controls and engines, improve a computer system's ability to handle higher rates of data transfer, as data transfer quantity and speed continue to increase, high speed messaging methodologies become more complicated and contribute more system overhead.

SUMMARY

Embodiments are directed to a computer system for managing data transfer. The system includes a memory, a processor communicatively coupled to said memory, a send component, a receive component having a message queue and a controller, and a link interface communicatively coupling said send component to said receive component. The link interface includes at least one mainline channel and a sideband channel. A data transfer mechanism of said at least one mainline channel has higher overhead than a data transfer mechanism of said sideband channel. The computer system is configured to perform a method including transmitting, by said send component, mainline channel messages over said at least one mainline channel from said send component to said receive component. The method further includes transmitting, by said send component, sideband channel messages over said sideband channel from said send component to said message queue of said receive component. The message further includes utilizing said controller to control a flow of said sideband channel messages to said message queue without relying on sending feedback to said send component about said flow.

Embodiments are directed to a computer implemented method for managing data transfer. The method includes transmitting, by a send component, mainline channel messages from said send component to a receive component over at least one mainline channel of a link interface. The link interface communicatively couples said send component to said receive component. The method further includes transmitting, by said send component, sideband channel messages from said send component to a message queue of said receive component over a sideband channel of said link interface. The method further includes a data transfer mechanism of said at least one mainline channel having higher overhead than a data transfer mechanism of said sideband channel. The method further includes utilizing a controller of said receive component to control a flow of said sideband channel messages to said message queue without relying on sending feedback to said send component about said flow.

Embodiments are directed to a computer program product for managing data transfer. The computer program product including a computer readable storage medium having program instructions embodied therewith the program instructions readable by a processing circuit to cause the processing circuit to perform a method. The method includes transmitting, by a send component, mainline channel messages from said send component to a receive component over at least one mainline channel of a link interface, said link interface communicatively coupling said send component to said receive component. The method further includes transmitting, by a send component, sideband channel messages from said send component to a message queue of said receive component over a sideband channel of said link interface. A data transfer mechanism of said at least one mainline channel has higher overhead than a data transfer mechanism of said sideband channel. The method further includes utilizing a controller of said receive component to control a flow of said sideband channel messages to said message queue without relying on sending feedback to said send component about said flow.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
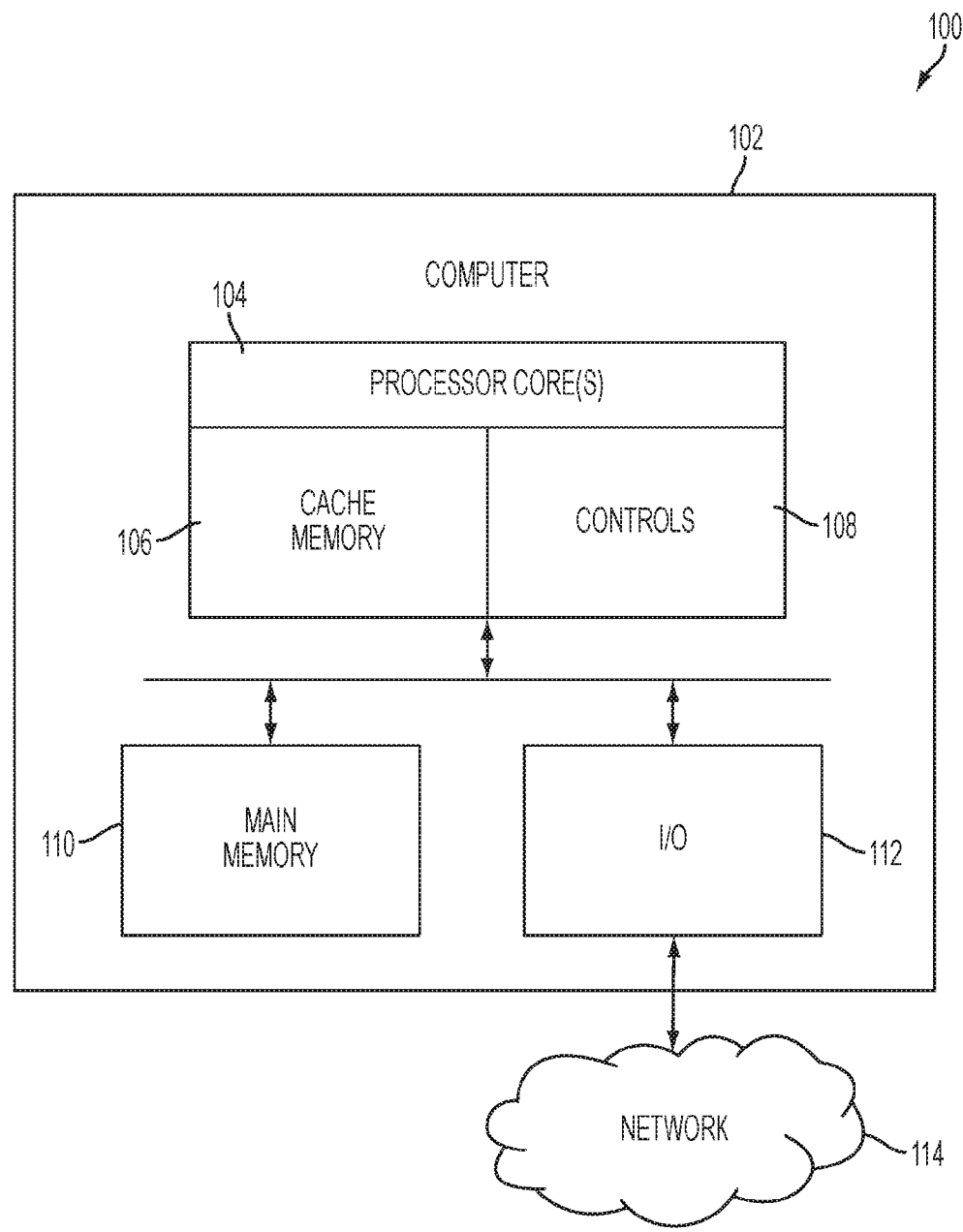
FIG. 1 depicts a block diagram illustrating an example of a computer system in accordance with one or more embodiments.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

The present disclosure and exemplary embodiments described herein provide methods and computer systems for managing data transfers in a high-speed data transfer system. Contemporary computer data transfer mechanisms/methodologies provide homogenous data transfer, which tend to be high-speed, complicated systems such as DMA controls and engines. These high-speed data transfer methodologies improve data transfer speeds but at the cost of higher system overhead.

Unlike contemporary, high speed data transfer methodologies, the present disclosure provides relief to system overhead by providing a sideband channel for sideband messages that don't have the time sensitivity of other, mainline messages. The sideband messages may include administrative messages that provide information about the state of mainline messages. Thus, sideband messages may include messages such as link management, link initialization, notifications, bug tracking, and others. A physical link interface under one or more embodiments of the present disclosure includes a mainline channel for transmitting mainline messages, along with a sideband channel for transmitting sideband messages. By implementing a simple hardware configuration on the send and receive sides of the sideband channel, and transferring primary control information over sideband message flow to a firmware controller on the receive side, system overhead is reduced. In one or more embodiments, the simple sideband channel hardware includes a transmit register, a receive register and a message queue on the receive side. The sideband channel hardware simply writes sideband channel messages to the transmit register and sends the sideband channel messages over the sideband channel whenever the link is uncongested. The transmission scheme therefore has no special flow control responsibility, or any knowledge as to where in the receive memory the messages are stored.

Congestion can result from the physical link experiencing heavy traffic in the mainline channels, the sideband channels, or both. When a message is written into the transmit register, if the link is currently transmitting a mainline channel message, the transmission of the sideband message is delayed until the mainline message transmission is complete. If the system firmware attempts to write another message to the transmit register prior to the transmission of the previous sideband message, the system firmware receives a feedback signal indicating that the transmit register is busy.

System overhead may be further reduced by providing a fixed-maximum-length for sideband channel message packets. For sideband messages larger than the fixed-maximum-length packet, the send side disassembles the sideband messages into packets having the fixed-maximum length, and the receive side reassembles the fixed-maximum length sideband message packets into the sideband message.

Turning now to the drawings in greater detail, wherein like reference numerals indicate like elements, FIG. 1 illustrates an example of a computer system 100 including an exemplary computing device ("computer") 102 configured for managing data transfer in accordance with the present disclosure. The embodiments of the present disclosure may be applied to data transfers between various components and subsystems of computer 102. In addition to computer 102, exemplary computer system 100 includes network 114, which connects computer 102 to additional systems (not depicted) and may include one or more wide area networks (WANs) and/or local area networks (LANs) such as the Internet, intranet(s), and/or wireless communication network(s). Computer 102 and additional system are in communication via network 114, e.g., to communicate data between them.

Exemplary computer 102 includes processor cores 104, main memory ("memory") 110, and input/output component(s) 112, which are in communication via bus 103. Processor cores 104 include cache memory ("cache") 106 and controls 108. Cache 106 may include multiple cache levels (not depicted) that are on or off-chip from processor 104. Memory 110 may include various data stored therein, e.g., instructions, software, routines, etc., which, e.g., may be transferred to/from cache 106 by controls 108 for execution by processor 104. Input/output component(s) 112 may include one or more components that facilitate local and/or remote input/output operations to/from computer 102, such as a display, keyboard, modem, network adapter, etc. (not depicted).

Figure 2:
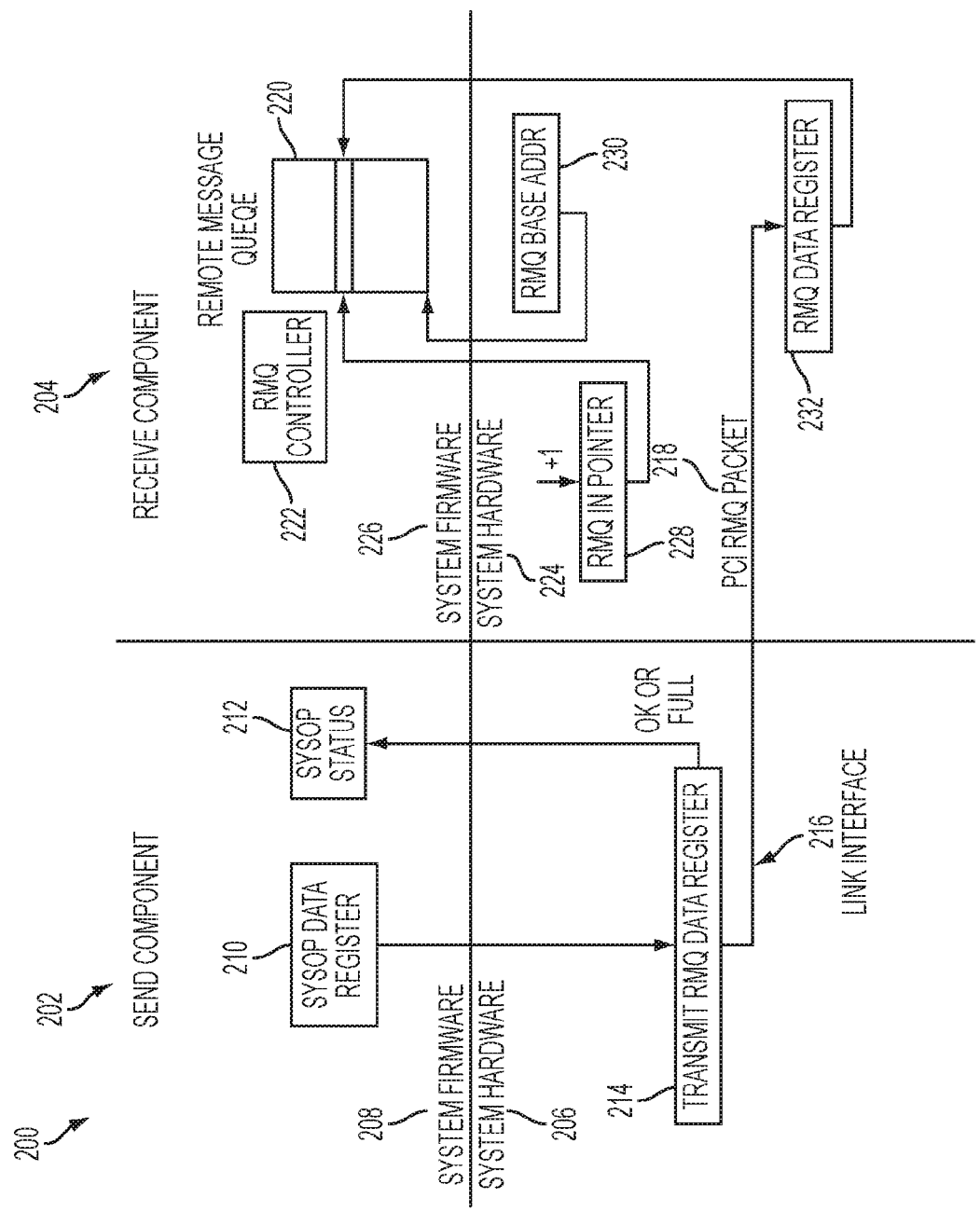
FIG. 2 depicts a block diagram illustrating an example of a data transfer configuration in accordance with one or more embodiments.

FIG. 2 illustrates a data transfer configuration 200 of one or more embodiments of the present disclosure. Data transfer configuration 200 includes a send component 202, a receive component 204, send-side system hardware 206, send-side system firmware 208, SYOP (system operation) data register 210, SYSOP status 212, transmit RMQ data register 214, link interface 216, PCI RMQ packet 218, remote message queue (RMQ) 220, RMQ controller 222, receive-side system hardware 224, receive-side system firmware 226, RMQ index pointer 228, RMQ base address 230 and RMQ data register 232, configured and arranged as shown.

In operation, the transmission of RMQ messages may be initiated by a global command specifying a "write remote message queue" operation. The command initiates the process that sends packets of RMQ data 218 to send-side system hardware 206, and send-side system hardware 206 places this data into a transmit buffer (not depicted) that will subsequently place the data into transmit RMQ data register 214 via SYSOP data register 210. Send component 202 keeps no state information, counters, data modification logic (such as valid bit manipulation), etc. The flow control is managed by send-side and receive-side system firmware 208, 226, and primarily by RMQ controller 222. When send-side system hardware 206 receives a write remote message queue command, it simply sends the RMQ packet 218, if link interface 216 is not congested.

RMQ messages are discarded at send component 202 when the transmit buffer is full and there are no available slots to accept the data in the global command. In one example, if receive component 204 is experiencing slow mainline channel response times, the PCIe flow control may slow down traffic on link interface 216, and this may cause transmit RMQ data register 214 to become full preventing RMQ packets 218 from being accepted by the transmit buffer. In another example, the transmit buffer is full when memory responses at send component 202 are delayed for outstanding mainline message reads, and all the transmit buffer slots are allocated for these mainline message responses. If the transmit buffer is full and a global command for the RMQ is received, send-side system hardware 206 may discard the message and send a special error return code (FULL) to SYOP status 212. In response, send-side system firmware 208 performs an appropriate recovery. As part of the recovery, send-side system firmware 208 may reissue the global command for the RMQ message after a predetermined time, for example several milliseconds. Send-side system firmware 208 may see this busy condition when sending any RMQ message, even if no previous RMQ messages have been sent. In other words, send-side system firmware 208 cannot devise an end-to-end flow control mechanism guaranteeing no busy conditions because only one message may be outstanding at a time. Under this scenario, busy conditions may occur at any time.

At the receive component 204, RMQ 220, which may be implemented as a single circular queue, is maintained by receive-side system hardware 224. RMQ 220 is preferably part of system memory (e.g., cache memory 106, main memory 110, depicted in FIG. 1). RMQ may be implemented as a queue having 4096 bytes, naturally aligned. Each entry in RMQ 220 may be set to a fixed-maximum-length, for example 8 bytes. Message buffers (not depicted) allow for concurrent operations in the mainline channel. Thus, a 4096 byte queue allows for up to 4 sideband messages for each of 128 concurrent operations in the mainline channel, minus any link state change event entries. RMQ base address register 230 maintains the base address of RMQ 220 and maintains a queue entry in RMQ index pointer 228, which simply wraps when it reaches the end of RMQ 220. The receive-side system hardware 224 has no notion of the fullness of RMQ 220. Each time a RMQ packet 218 is received, receive-side system hardware 224 writes it in the location specified by RMQ base address register 230 and RMQ index pointer 228, and increments RMQ index pointer 228. When RMQ index pointer 228 reaches all ones, it wraps back to zero.

Overall flow control of RMQ 220 is provided by receive-side system firmware 226 working through RMQ controller 220. Although shown as separate items for ease of illustration and description, it is understood that the controller 220 may not in fact be a separate component, and its functionality may be integral with receive-side system firmware 226. Additional details of flow control of RMQ 220 are described later in this disclosure in connection with FIGS. 3-9.

After receive component 204 writes an 8 byte entry into RMQ 220, it may perform a completion sequence. The sequence may include multiple stages, for example one or more set bit operations, followed by an interrupt request. An example of a suitable multiple stage completion sequence is disclosed in a co-pending, commonly assigned U.S. patent application, entitled "COALESCING STAGES IN A MULTIPLE STAGE COMPLETION SEQUENCE," by Thomas A. Gregg and Kulwant M. Pandey, having U.S. application Ser. No. 14/211,167, filed Mar. 14, 2014, and expressly incorporated by reference herein. For RMQ 220, the commands (write, set bit commands, and interrupt request) to execute the completion sequence do not use a Node ID because RMQ 220 is not associated with any particular message buffer. Instead, these commands use the "no ordering required" attribute. Because using the "no ordering required" attribute disables automatic ordering, receive-side system hardware 224 must order these commands itself by waiting for the "write done" from each command before proceeding to the next command. This ordering method has more latency than automatic ordering. However, this latency is tolerable because RMQ communications have relatively relaxed latency requirements.

Figure 3:
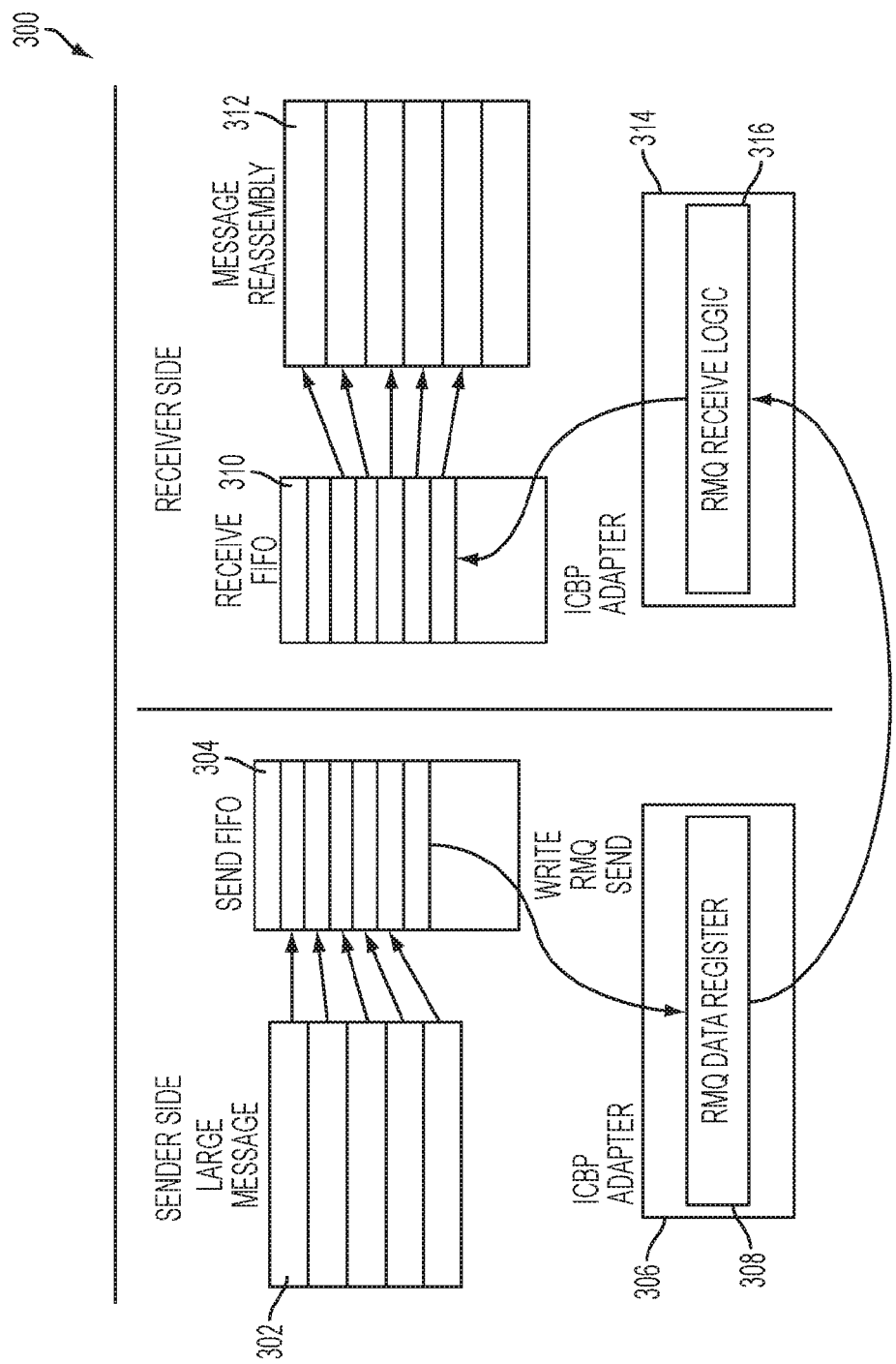
FIG. 3 depicts a block diagram illustrating an example of a message protocol and data transfer configuration in accordance with one or more embodiments.

FIG. 3 depicts a block diagram illustrating additional details of a message protocol 300 in accordance with one or more embodiments. As previously described, overhead is reduced under one or more disclosed embodiments by providing a simple hardware design that is limited to sending fixed-maximum-length packets. In the disclosed embodiments, the fixed-maximum-packet length is chosen to be 64 bits. Thus, rather than increase complexity of the RMQ hardware, message protocol 300 manages the RMQ packet information that is passed across the link interface via the single mailbox register. Message protocol 300 disassembles large messages into link packets at the sender and reassembles the link packets into the original large message at the receiver.

FIG. 3 depicts message protocol 300, a large message 302, a send FIFO 304, a send-side adapter 306, an RMQ data register 308, a receive FIFO 310, a message reassembly 312, a receive-side adapter 314 and an RMQ receive logic 316, configured and arranged as shown. Message protocol 300 begins when large message 302 (e.g., 256 bytes or less), although still relatively large, is not classified as a mainline message that would justify the use of a mainline channel of link interface 216 (depicted in FIG. 2). Thus, large message 302 may be sent across link interface 216 using the disclosed RMQ sideband channel. In addition to the packet's payload, the packet's length should be enough that space is not wasted in send FIFO 304 and receive FIFO 310 with non-existent information from the packet. Thus, the packet length may be chosen to be an eight bit integer to keep packet payloads below 256 bytes.

Figure 4:
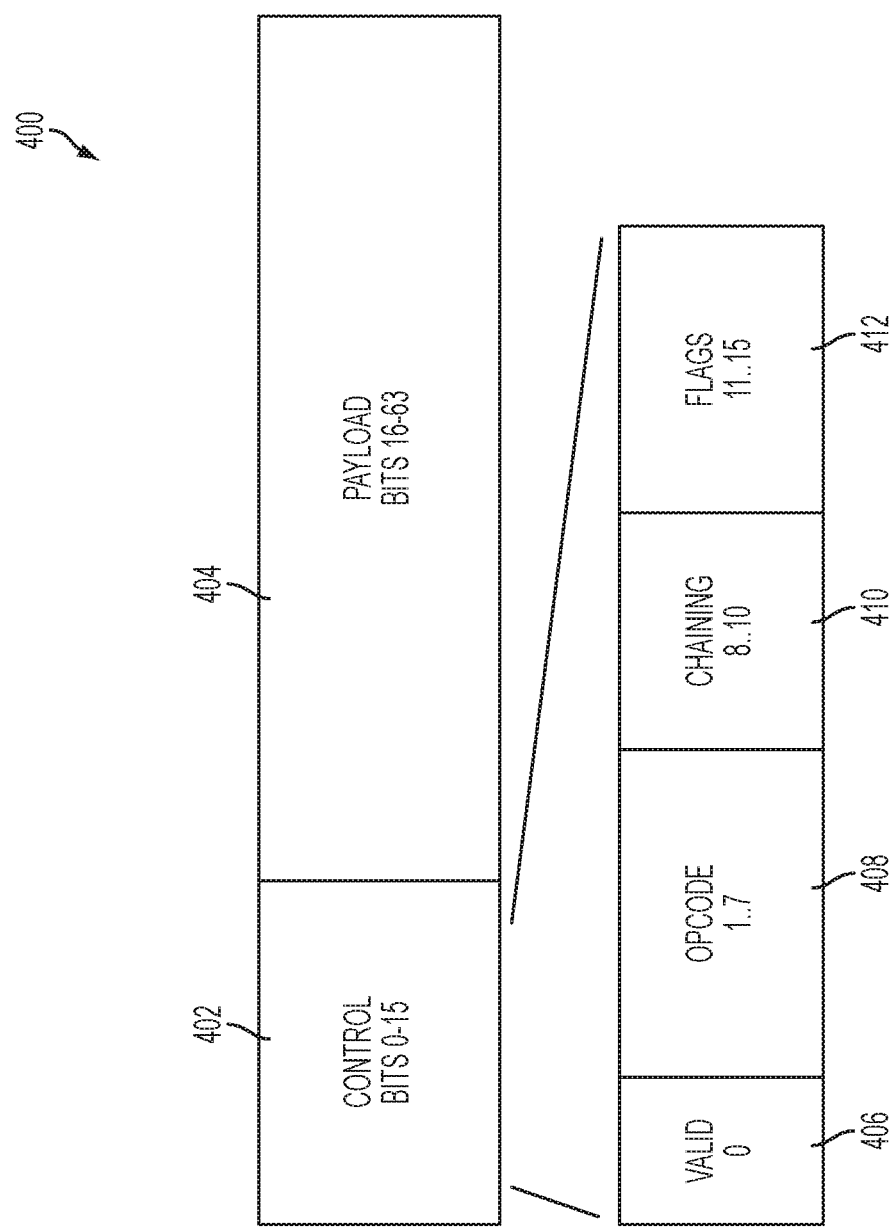
FIG. 4 depicts a block diagram illustrating an example of a packet format in accordance with one or more embodiments.

FIG. 4 depicts an example of an RMQ packet format 400 in accordance with one or more embodiments. Packet format 400 includes control bits 402, payload bits 404, a valid bit 406, operational (op) code bits 408, chaining bits 410 and flag bits 412, configured and arranged as shown. Details of message protocol 300 will now be described with reference to FIGS. 3 and 4. The overall packet structure is 16 bits of control 402 and 48 bits available for payload 404. The 16 bits of control 402 contains a valid bit 406, opcode 408, chaining bits 410, and flags 412. Valid bit 406 is cleared when the 64 bit format 400 is retrieved from send FIFO 304 prior to transmission, or retrieved from receive FIFO 310 after reception. Valid bit 406 also helps to detect whether or not the FIFO (304, 310) has been over run. Opcodes 408 are used to reassemble multiple 64 bit chunks as well as providing an indicator of which handler routine should process the packet. Chaining bits 410 are used to identify the location of a given packet within large message 302, such as "at beginning," or "more to come," or "beginning and end,"

or "end with data" or "intermediate with data." The final part of control bits 408 are flags bits 412, which create more flexibility in the sending structure for additional functionality that may need to be communicated at a later point. The flags bits 412 also make the payload 404 round off the 6 bytes, which are easier to manage.

Figure 5:
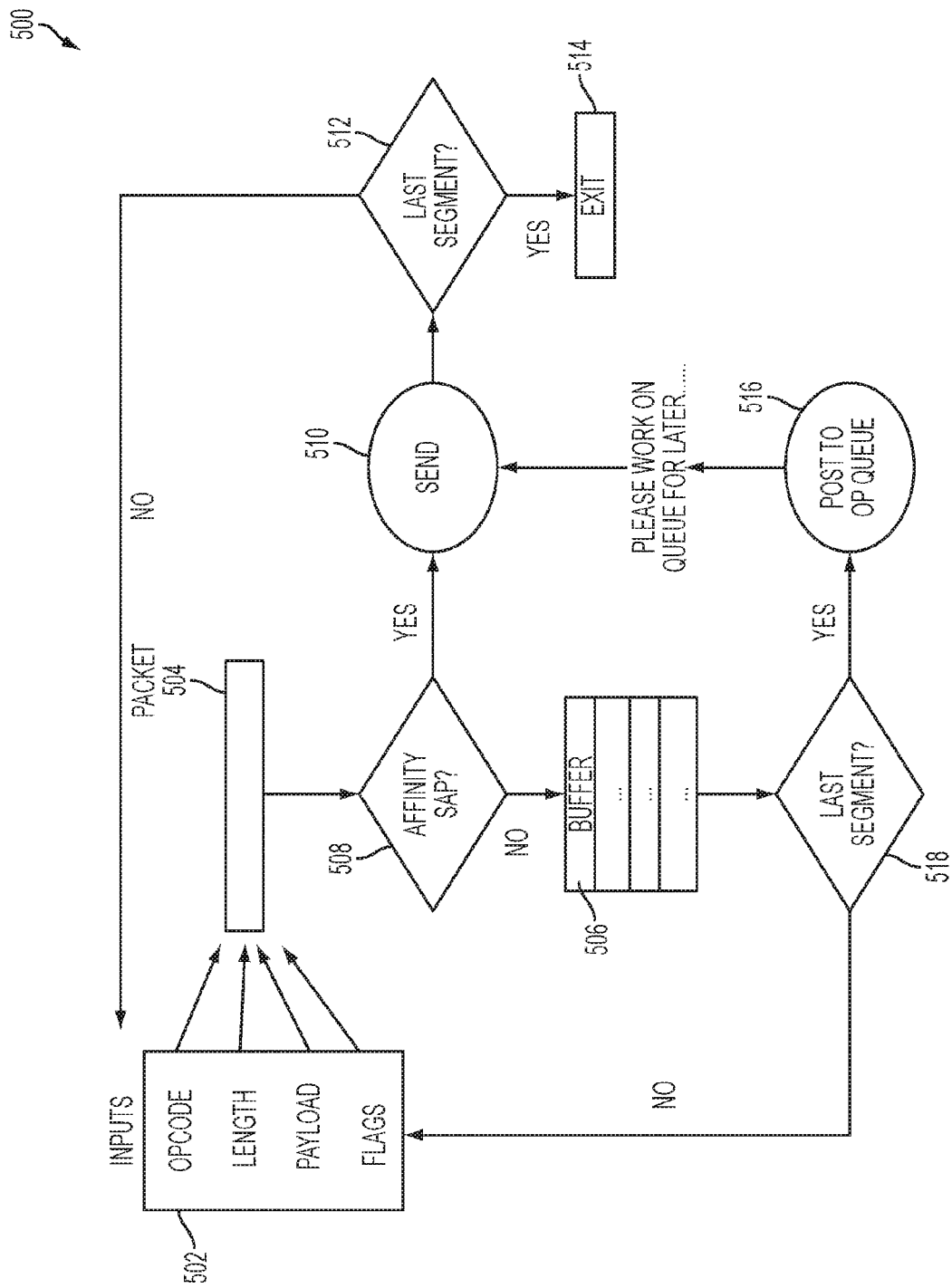
FIG. 5 is a flow diagram illustrating an example of a send protocol in accordance with one or more embodiments.

FIG. 5 is a flow diagram illustrating a send protocol 500 for message protocol 300 depicted in FIG. 3 and packet format 400 depicted in FIG. 4, in accordance with one or more embodiments. Of the bits in packet format 400, opcode 408, flags 412 and payload 404 include an adapter identifier, port number, and length. Thus, they are provided as inputs 502 to packet 504 of send protocol 500. Because system firmware 208, 226 (depicted in FIG. 2) is a multi-processor system, before the 64-bit packet formation can occur, the relevant processor checks at block 508 to determine if it is the "affinity" processor that, in effect, has ownership of message traffic to the target RMQ. Providing an "affinity" processor allows the link to serialize transmission of RMQ messages. If send protocol 500 is on the affinity processor, the answer to the inquiry at decision block 508 is yes, and block 510 sends the formed packets directly into the underlying send infrastructure. Block 512 determines whether this is the last packet. If the answer to the inquiry at block 512 is yes, block 514 exits. If the answer to decision block 512 is no, send protocol 500 returns to inputs 502. If the answer at decision block 508 is no, the packet is loaded into buffer 506. Block 518 determines whether this is the last packet. If the answer to the inquiry at block 518 is yes, the message is posted to an operational queue at block 516 for the actual affinity processor of the target RMQ. If the answer to decision block 518 is no, send protocol 500 returns to inputs 502.

After checking for the affinity processor at block 508, send protocol 500 may also check to make sure that the length parameter is not zero to make sure that the RMQ message we are attempting to send is not a null message. If all of the parameter checks are successful, the number of segments may be calculated (i.e., the number of 6 byte pieces the payload must be broken down into). If we are not on the affinity processor, the buffer of the appropriate length can be created.

The first packet in all messages through send protocol 500 is used to pass the length of the message from inputs 502 to the other side of the link to be used as part of the re-assembly process on the receiving side. Packet 504 takes opcode 408, flags 412, and the derived length information function and sets the chaining 410 to "beginning with more." If at block 508 we are not running on the affinity processor, the packet is placed inside buffer 506. Otherwise it is passed to the underlying send code through block 510. Send protocol 500 loops back to inputs 502 and grabs the next opcodes 408 and flags 412, and moves through payload 404 one byte at a time until the payload is full. Again, block 508 checks for the affinity processor, and in response the packet is placed in the correct location. Blocks 512 and 518 increment the number of segments sent on each iteration of this process until the last segment. The last segment drops out of the iterative loop and chaining is used to mark the last segment with data. The last segment is then placed into its correct location. When the last packet is placed inside buffer 506, the buffer pointer (not depicted) is placed inside of an operation queue at block 516 so the work item may be processed by its appropriate affinity processor. Once the work item comes off the operational queue at block 516, the same sending function (block 510) is used to push the packets in buffer 506 through the RMQ link 216 (see, FIG. 2). As depicted in FIG. 2, RMQ link 216 writes each of the 64-bit packets to RMQ register 214, and send-side system hardware 206 transmits the data as sideband messages through the sideband channel of link 216.

Figure 6:
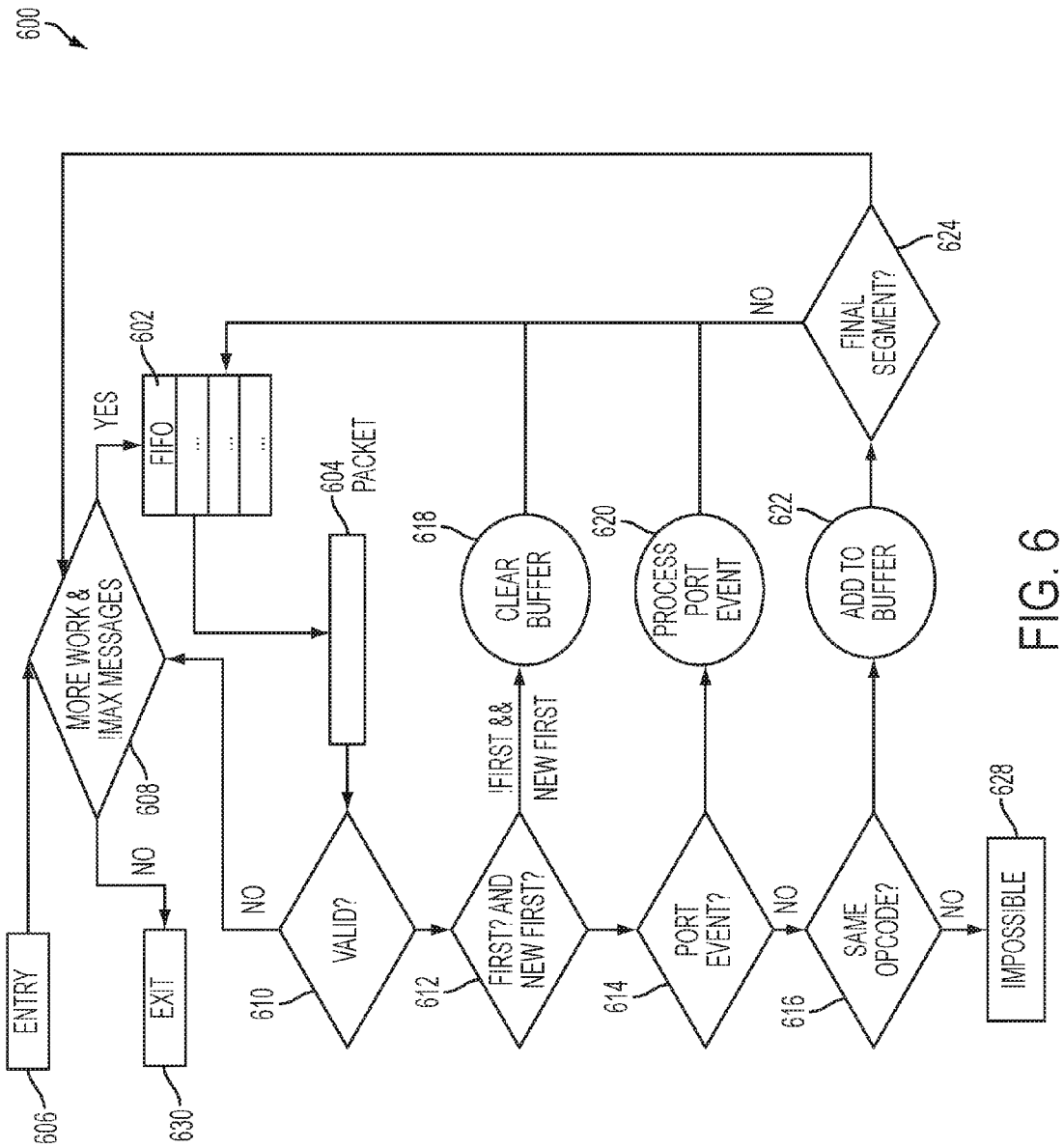
FIG. 6 is a flow diagram illustrating the formation of a receive message in accordance with one or more embodiments.

FIG. 6 is a flow diagram illustrating a methodology 600 for the formation of a receive message in accordance with one or more embodiments. Once the packets are through RMQ link 216 (depicted in FIG. 2) and in memory on the other receive side, the original group of data needs to be re-assembled and passed to the correct function handler. The packet is received, placed into a circular FIFO 602 and an interrupt is issued. The interrupt handler posts the notification of the received packets to the operation queue of the affinity processor for the RMQ at block 604. When the work to be done comes off of the operation queue, a buffer (not depicted) of the maximum size is created to store the message. The maximum size is used because the actual size of the test message is unknown.

After the buffer is created, the valid bits 406 (depicted in FIG. 4) are checked at block 610, and if valid, it is determined that there could possibly be work to do in reassembling packets. If there are no valid segments inside of receive FIFO 602, the interrupt for the packet is over-initiative, and the packet was already taken out of receive FIFO 602 in a previous call to this function. Another possibility is that the entire message has not arrived yet, which results in an invalid entry in receive FIFO 602. In this case, methodology 600 simply returns through decision block 608 and frees the buffer for the allocated message. Packets to an incomplete message a not taken out of receive FIFO 602.

During the initial iteration of methodology 600, on the first pass through receive FIFO 602, if decision block 610 determines that the packet is valid, block 614 determines whether or not it is a hardware port event. Hardware port events are single-entry RMQ packets injected by the hardware and can occur at any time, so it could appear in the middle of a message. Thus, hardware port events are handled immediately when they are found. Once the processing of the hardware port event is complete (block 620), control is passed to receive FIFO 602 for the next iteration of the loop. If the opcode 408 (depicted in FIG. 4) of the current iteration is not for a hardware port event, block 616 checks to make sure that it has the same opcode 408 as the previous message. For the first iteration this must be true but in subsequent iteration if it is not true it is determined that there is a problem with the messages being sent. If opcodes 408 are the same, chaining bits 410 (depicted in FIG. 4) are checked to determine whether the last segment has been found, and a "done" flag is set. In both cases the segment is copied from receive FIFO 602 into the buffer with its valid flag turned off.

For the second iteration and beyond, the first check is whether or not a new first segment is seen inside receive FIFO 602 based on evaluating chaining bits 410 (depicted in FIG. 4). If a new first segment is seen, the previous message is ignored and drained out of receive FIFO 602 by turning off all of the valid bits for those segments. After receive FIFO 602 has been scrubbed the index is updated in an adapter level control block and the message buffer is zeroed out. The loop state is then reset to the starting value and control is passed to the next iteration.

Once the end of the message has been seen, and a "done" flag is set with the complete message inside the buffer, receive FIFO 602 is scrubbed of its entries by turning off their valid bits. Alternatively if the end of the message is never seen, the loop will stop once the maximum number of messages is reached, and a call to "impossible" is made at block 628 in order to ensure that methodology 600 does not loop through receive FIFO 602 for too long. The buffer, if the entire message is seen, is then handed off to a message handler, which will pass it off to the correct sub routine handler to process the message. Once the processing of the message is complete, receive FIFO 602 is looped over again to see if there is another message that requires processing. The process of checking for new messages will continue until the maximum allowed number of messages to be processed is reached (block 608). When the maximum number of messages to be processed at once is reached, the routine exits at block 630.

Figure 7:
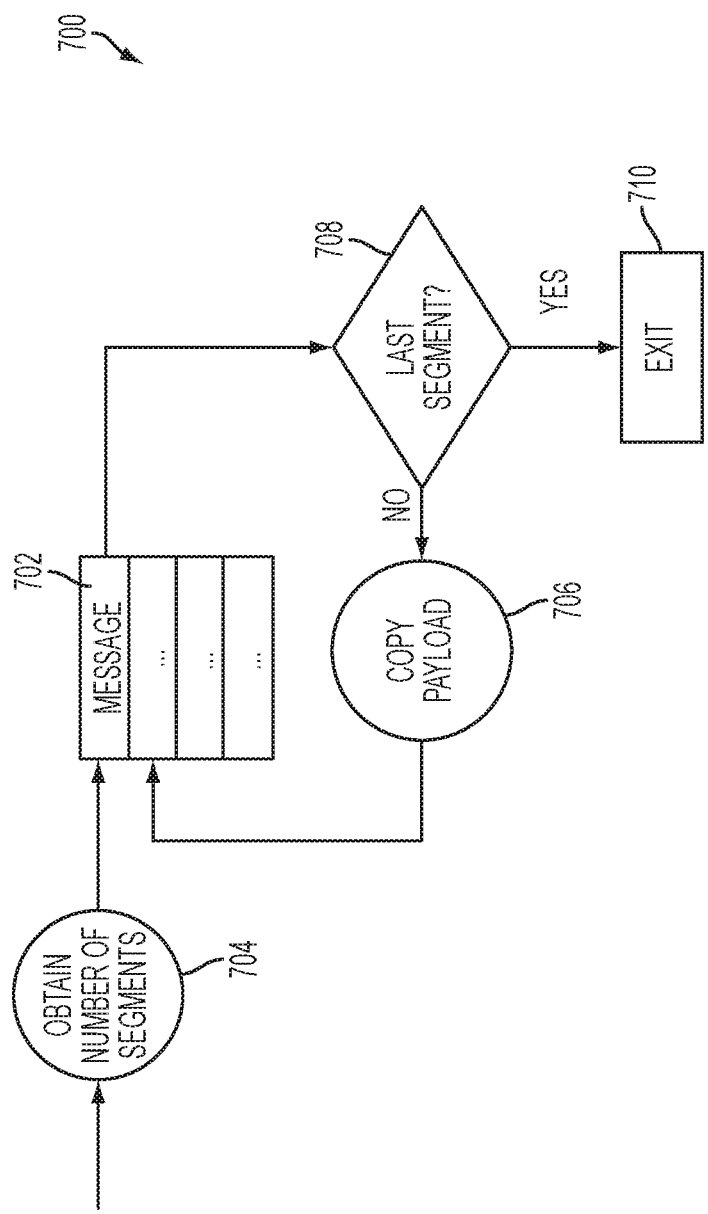
FIG. 7 is a flow diagram illustrating the formation of a payload assembly in accordance with one or more embodiments.

FIG. 7 is a flow diagram illustrating a payload assembly methodology 700 in accordance with one or more embodiments. Payload assembly methodology 700 assembles the message segments into the actual payload itself. Once the length is known the number of segments is calculated at block 704, and the message is iterated over segment by segment by payload pointer 702 and block 706. On each iteration the payload is extracted byte by byte and placed inside of payload pointer 702 until the length in bytes is reached.

Figure 8:
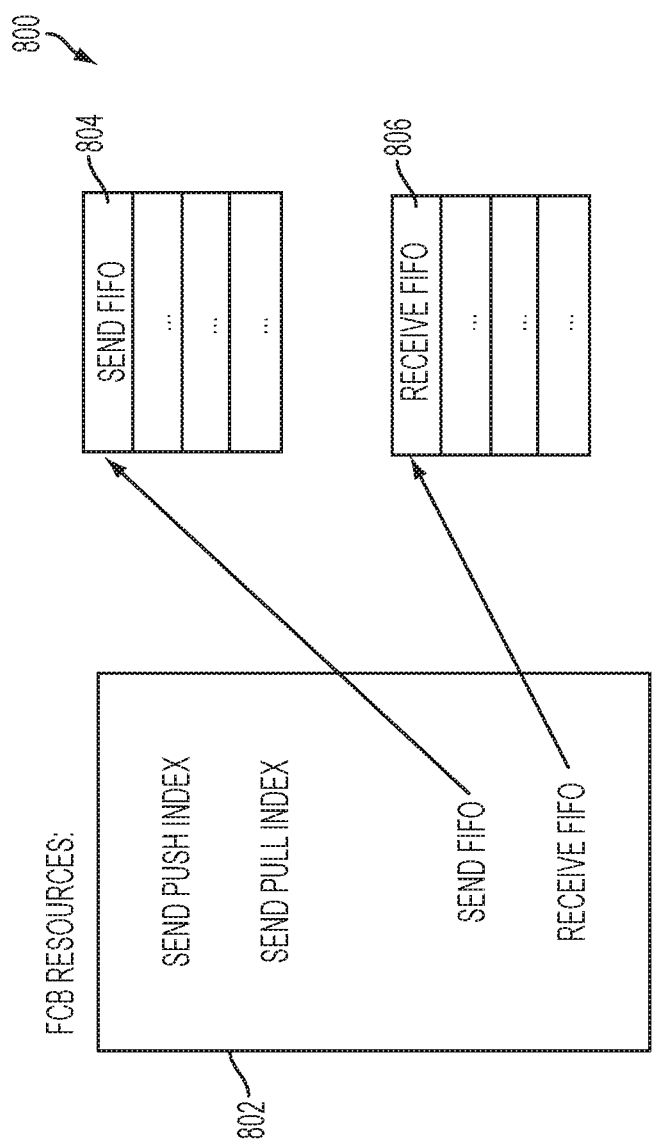
FIG. 8 depicts a block diagram illustrating an example of a first-in-first-out (FIFO) control block in accordance with one or more embodiments.
Figure 9:
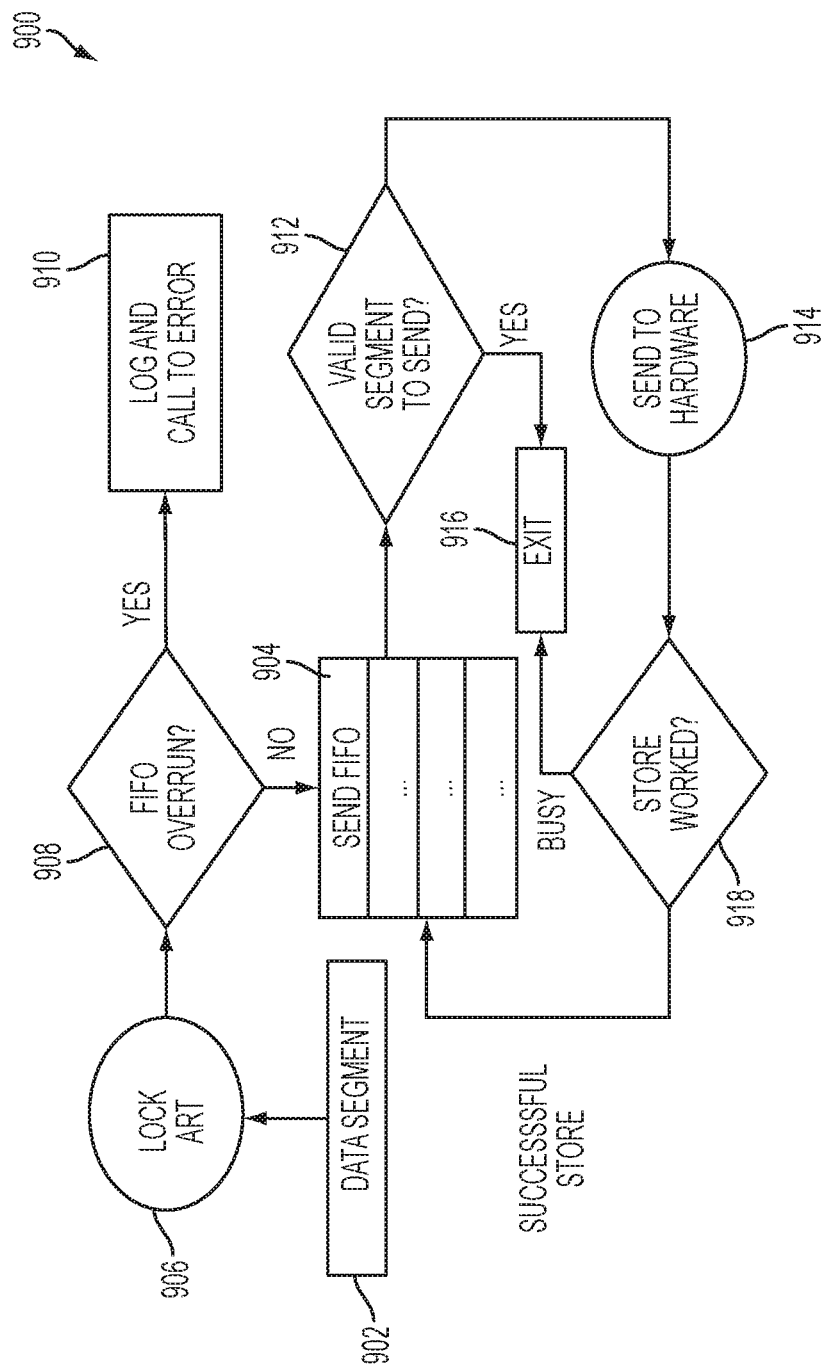
FIG. 9 is a flow diagram illustrating an example of a send protocol with congestion tolerance in accordance with one or more embodiment.

FIG. 8 depicts a block diagram illustrating an example of a first-in-first-out (FIFO) control block 800 in accordance with one or more embodiments. FIG. 9 is a flow diagram illustrating an example of a congestion tolerance methodology 900 in accordance with one or more embodiment. FIGS. 8 and 9 illustrate details of how to manage the situation in which link adapter 216 (depicted in FIG. 2) is congested, and transmissions over the sideband channel of link adapter 216 must be delayed.

The congestion tolerance methodology 800 will now be described with alternating reference to FIGS. 8 and 9. As shown in FIG. 8, the general configuration of FIFO control block 800 begins by assembling information/resources 802 desired to be sent to the other side of the link. As described previously herein, larger messages are broken down into smaller chunks, which in the disclosed examples are each 64 bits. Before placing a 64 bit chunk on send FIFO 804, control block 800 that contains send FIFO 804 is locked, as shown by block 906 of FIG. 9. When locking FIFO control block 800, spinning is allowed to occur such that there is not an immediate call to error if the lock is not obtained.

FIFO control block 800 is locked because it contains valuable information for the management of send information across the sideband channel of link 216 (depicted in FIG. 2). The information contained is not only the send and receive FIFOs 804, 806, but also the indexes needed to keep track of where new entries go and where the oldest entries are to be taken out of send and receive FIFOs 804, 806. With the lock in place, only one task is allowed to change any of these values at once. When sending information, the send push index should point to where the next entry should go in send FIFO 804. Before writing a new valid 64 bit chunk of data, a current index is checked to determine whether the current data already in that spot is valid. If the current data is valid, send FIFO 804 has been over run as shown by decision block 908 of FIG. 9, and the system has a problem resulting in a system check stop at block 910.

If the send push index is pointing to a location in send FIFO 804 that does not have valid data, the new 64 bit chunk of data is marked valid and placed into send FIFO 804 at the current send push index. The send push index is then incremented and masked to the size of send FIFO 804. FIFO control block 800 is then unlocked and in most cases locked again by the next function call, which attempts to take 64 bit chunks out of send FIFO 804 and push them through the sideband channel of link 216 (depicted in FIG. 2). FIFO control block 800 may be unlock here to attempt to allow processes that are trying to place data into send FIFO 804 do so before send FIFO 804 may need to be locked for a lengthy period while valid data is put through the sideband channel of link 216 (depicted in FIG. 2). If FIFO control block 800 is locked to allow packets to be pushed through the sideband channel of link 216, send pull index loops through send FIFO 804 until either no more valid entries are found or the sideband channel of link 216 (depicted in FIG. 2) is currently busy. As shown in FIG. 9, the first iteration of checking for valid entries is done at decision block 912 by checking the current send pull index for the valid bit, and if a valid segment is found block 914 sends it to the send-side system hardware 206 (depicted in FIG. 2). The address used will be interpreted by the send-side system hardware 206 as a write to transmit RMQ data register 214, which will cause send-side system hardware 206 to attempt to send the 64 bit chunk of data over the sideband channel of link 216 (depicted in FIG. 2).

For most writes operations, send-side hardware 206 will communicate that the transmission of information was successful (e.g., "OK" notification shown in FIG. 2). There is the possibility that send-side hardware 206 determines that link 216 (depicted in FIG. 2) is congested and gives a "busy return code" (e.g., "FULL" notification shown in FIG. 2). In situations where a "busy return code" is generated, a new initiative is created to return, at a later time and on the same processor, to send the segment in send FIFO 804.

Technical effects and benefits include methods and computer systems for managing data transfers in a high-speed data transfer system. Contemporary computer data transfer methodologies provide homogenous data transfer, which tend to be high-speed, complicated systems such as DMA controls and engines. These high-speed data transfer methodologies improve data transfer speeds but at the cost of higher system overhead. Unlike contemporary, high speed data transfer methodologies, one or more embodiments of the present disclosure provides relief to system overhead by providing a sideband channel for sideband messages that don't have the time sensitivity of other, mainline messages. The sideband messages may include administrative messages that provide information about the state of mainline messages. Thus, sideband messages may include messages such as, such as link management, link initialization, notifications, bug tracking, and others. A physical link interface under one or more embodiments of the present disclosure includes a mainline channel for transmitting mainline messages, along with a sideband channel for transmitting sideband messages. By implementing a simple hardware configuration on the send and receive sides of the sideband channel, and transferring primary control information over sideband message flow to a firmware controller on the receive side, system overhead is reduced. In one or more embodiments, the simple sideband channel hardware includes a transmit register, a receive register and a message queue on the receive side. The sideband channel hardware simply writes sideband channel messages to the transmit register and sends the sideband channel messages over the sideband channel whenever the link is uncongested. The transmit therefore has no special flow control responsibility, or any knowledge as to where in the receive memory the messages are stored.

Technical effects and benefits further include methodologies and systems for managing transmissions of the sideband channel when the physical link is congested. Congestion can result from the physical link experiencing heavy traffic in the mainline channels, the sideband channels, or both. When a message is written into the transmit register, if the link is currently transmitting a mainline channel message, the transmission of the sideband message is delayed until the mainline message transmission is complete. If the system firmware attempts to write another message to the transmit register prior to the transmission of the previous sideband message, the system firmware receives a feedback signal indicating that the transmit register is busy.

Technical effects and benefits further include methodologies and systems for further reducing system overhead by providing a fixed-maximum-length for sideband channel message packets. For sideband messages larger than the fixed-maximum-length packet, the send side disassembles the sideband messages into packets having the fixed-maximum length, and the receive side reassembles the fixed-maximum length sideband message packets into the sideband message.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing data transfer, the system comprising:
   a memory;
   a processor communicatively coupled to the memory;
   a send component;
   a receive component having a message queue and a controller;
   a single link interface configured to communicatively couple the send component to the receive component;
   the single link interface comprising at least one mainline channel and a sideband channel; and
   a mainline data transfer mechanism of the at least one mainline channel having higher overhead than a sideband data transfer mechanism of the sideband channel, wherein said mainline data transfer mechanism comprises a different data transfer mechanism than said sideband data transfer mechanism;
   the computer system configured to perform a method comprising:
   analyzing, by the send component, according to at least one mainline message criterion, messages to be transmitted;
   classifying, by the send component, messages to be transmitted that do not meet the at least one mainline message criterion as sideband messages;
   transmitting, by the send component, mainline channel messages over the at least one mainline channel from the send component to the receive component;
   based at least in part on classifying messages to be transmitted that do not meet said at least one mainline message criterion as sideband messages, transmitting, by the send component, sideband channel messages over the sideband channel from the send component to the message queue of the receive component, wherein transmitting the sideband channel messages is limited to transmitting fixed-maximum-length packets;
   utilizing the controller to control a flow of the sideband channel messages to the message queue without relying on sending feedback to the send component about the flow;
   based on a determination that the single link interface is currently transmitting the mainline channel messages, delaying transmitting the sideband channel messages until transmitting the mainline channel messages is complete;
   disassembling, by the send component, the sideband channel messages into sideband channel message packets having the fixed-maximum-length; and
   reassembling, by the receive component, the fixed-maximum-length sideband channel message packets into the sideband channel message;
   wherein transmitting the sideband channel messages comprises:
   writing the sideband channel messages to a transmit register of the send component; and
   the transmit register placing the sideband channel messages on the sideband channel for transmission without relying on receiving feedback about the flow of the sideband channel messages to the message queue.

* * * * *